Aug. 25, 1959  T. J. JACKSON  2,900,870
PROJECTION SCREEN
Filed April 9, 1954  2 Sheets-Sheet 1
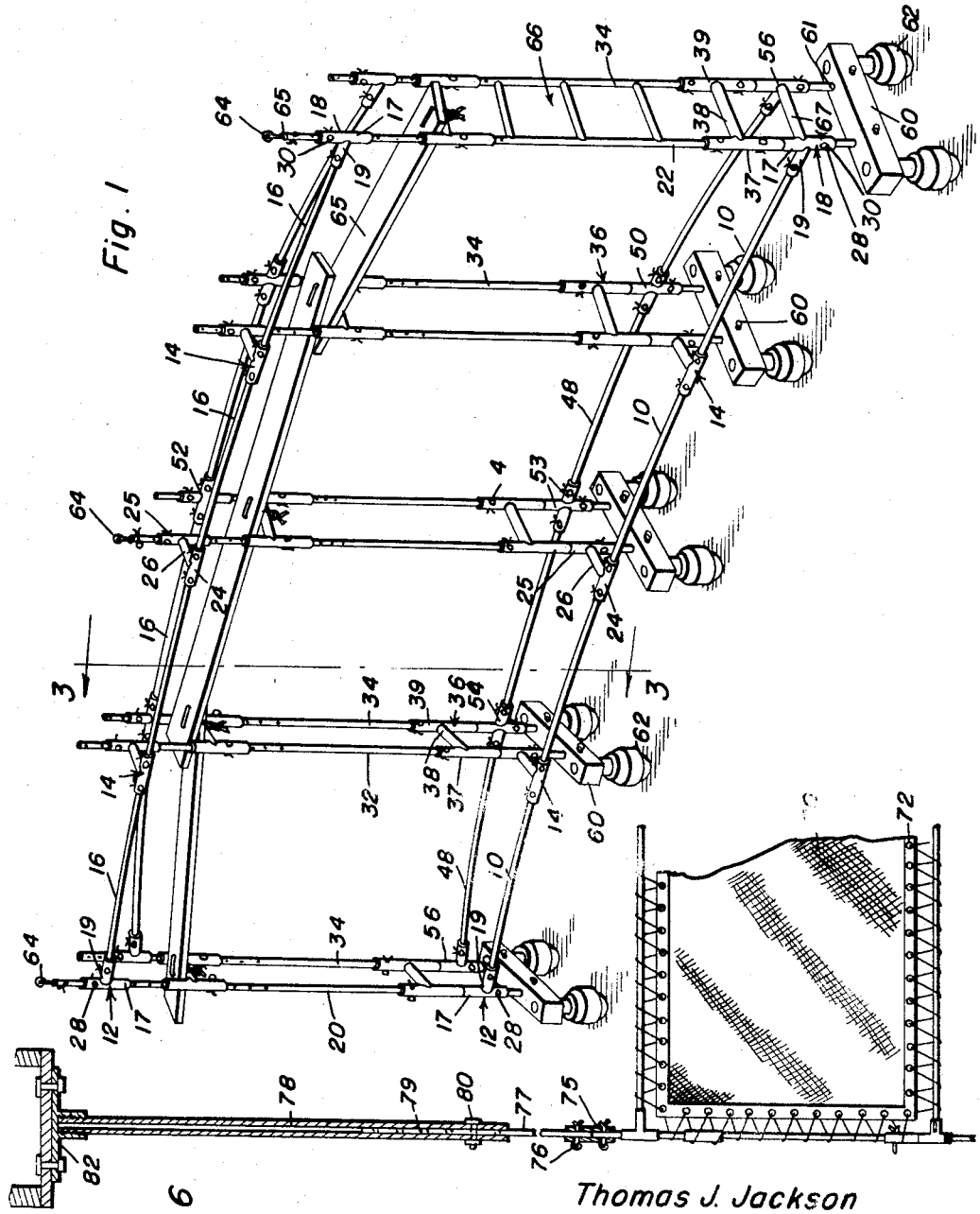
Thomas J. Jackson
INVENTOR.
BY *Clarence A. O'Brien*
*and Harvey B. Jackson*
Attorneys

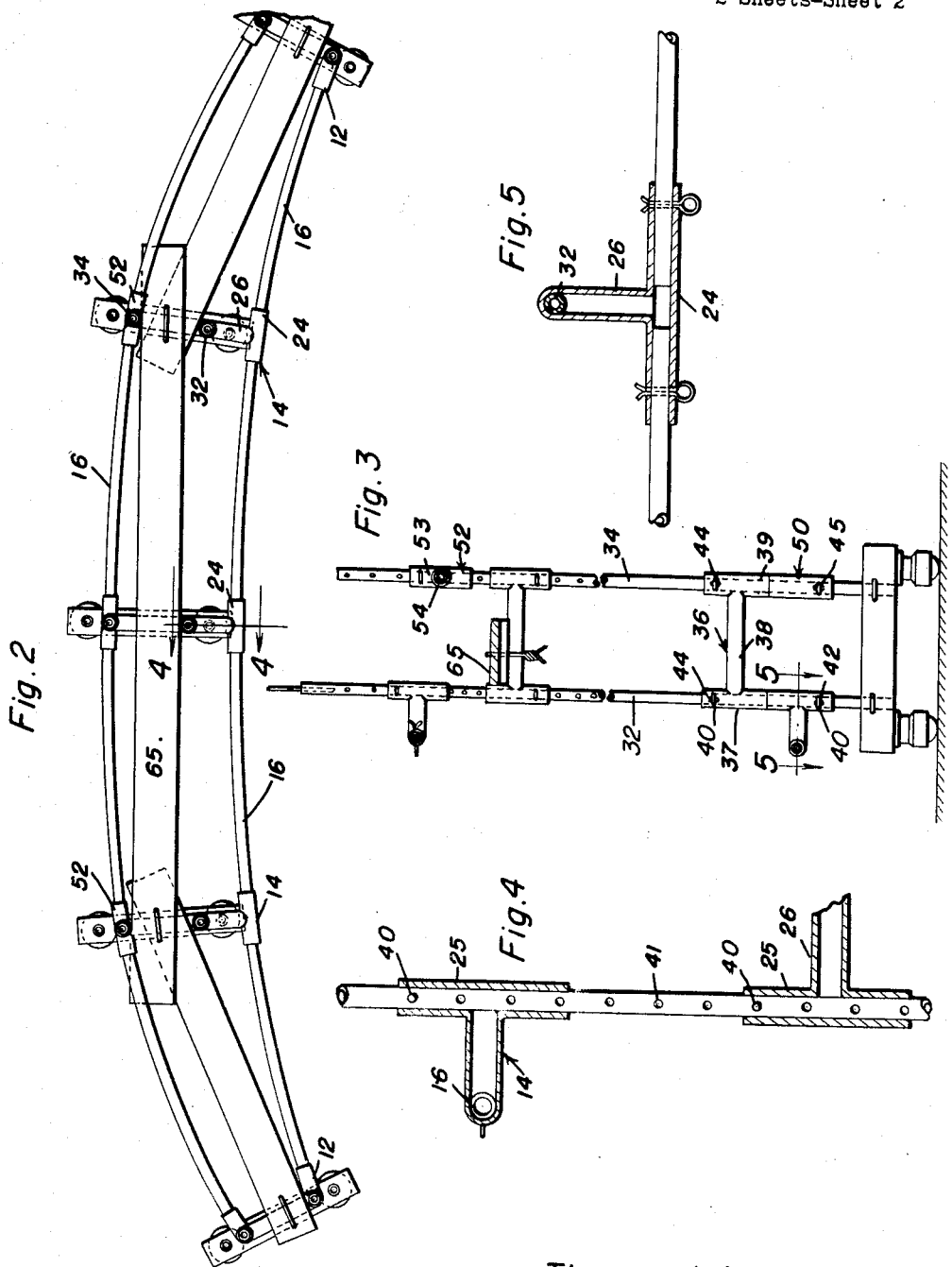

2,900,870
PROJECTION SCREEN

Thomas J. Jackson, Robstown, Tex.

Application April 9, 1954, Serial No. 422,150

3 Claims. (Cl. 88—28.9)

This invention relates to motion picture screens and more particularly to the supporting frame or structure of large size motion picture screens.

To improve the impression of reality motion picture screens of very large size are used in connection with special projection methods, using either a plurality of projectors or anamorphosis or similar picture compression methods with expansion of the pictures during projection. These large size screens occupying a wide angle must be curved for several reasons, one of them being, for instance, the lack of definition in the marginal parts of the screen if a single projector is used, and another reason being, for instance, that that section of the theater from which the spectators, sitting in front of the screen, have an undistorted view of the picture, is extremely limited if a screen of considerable size is used. Therefore, large sized curved screens are now frequently used, but in connection with such a large curved screen, covering a wide angle around a center approximately coincident with the projection booth, many disadvantages are experienced. Such a screen fills much room within a theater, makes part of the auditorium unusable, and its installation and removal, if necessary, is accompanied by many difficulties. A fixed projection screen of this type has therefore special disadvantages, as the auditorium should be usable indiscriminately for productions necessitating small and large screens, as well as for stage, concert and other performances during which a large curved screen is preferably entirely removed.

Such a removal is, of course, only necessary in connection with large curved screens of the above named type, but is unnecessary when flat screens are used, as flat screens may be mounted on a wall and need merely to be covered up if not wanted. It will thus be seen that in connection with curved screens of large size there arises the necessity of providing an easily removable supporting structure of considerable size, carrying the screen, which supporting structure should be easily movable and removable.

Lightweight frame structures have therefore been proposed, consisting of a skeleton frame made of one of the light metals or of a light metal alloy and supporting a suitable fabric or surface, but this type of frame proved to be unsatisfactory, because the surface of the fabric or other material forming the screen must be perfectly smooth and moreover must not touch any portion of the frame, two conditions which are very difficult to fulfill as the stretching of a fabric or other material of large size without creases or folds or other deviations from the prescribed surface causes a very heavy strain which leads to a deformation of the frame which in its turn produces irregularities of the surface of the screen.

A further problem which is difficult to deal with in connection with such a screen arises for the manufacturer of the screen on account of the varying size of the theaters and the varying configurations of the rooms in which the screen has to be mounted which difficulty is further complicated by the fact that each theater, for different projection methods, also requires screens of different size and configuration. This makes it necessary to use a special design for every theater and to provide theaters with a plurality of screens which are specially designed.

The invention consists in a supporting frame structure adapted to hold a screen consisting of a fabric or of other material, having a curved surface with a sufficiently high tension to produce a smooth and completely regular screen surface, while at the same time the screen supporting structure is so reinforced and braced that notwithstanding the lightweight and the relatively small size of each of the single supporting elements the tension of the fabric cannot cause a deformation of the frame structure, the arrangement being such that the reinforcing or bracing structure is removed from the screen so that it can never touch the same.

A further main feature of the supporting frame structure according to the invention consists in the adaptability and adjustability of the supporting frame structure which may be enlarged or reduced to the desired size so that curved screens of different sizes may be carried by practically the same frame structure which may be expanded and contracted without any change in the basic design. This makes it possible to manufacture such supporting structures for a screen using only a small number of designs, although the conditions in every theater differ somewhat from those in other theaters.

Further it is possible to use either the same design or only slightly different designs for supporting frames of different types and even for supporting frames which are either resting on a base standing on the floor and which are mobile on the floor and for frame structures which are suspended from the roof or the ceiling of the building.

It is therefore one of the main objects of the invention to provide a supporting frame structure for motion picture screens having supporting members of limited length forming units which are joined by couplings with each other and with bracing members which are spaced from and arranged behind the frame members which define the surface on which the screen is stretched.

A further main object of the invention consists in providing supporting frames of the above described type in which a plurality of series of reinforcing braces are arranged one behind the other behind the screen and spaced from the screen and from each other so as to form a frame structure which is reinforced in a plurality of planes, all these planes in which the reinforcing structure is located being arranged behind and spaced from the plane in which the screen surface is carried.

A further main object of the invention consists in providing a frame of the above described type consisting of completely adjustable units which units may therefore be spaced from each other to the desired extent and may also be arranged in the desired number, which structure thus permits to form a frame of any size which is usable in connection with unit pieces of different curvature and which is also reinforced to the desired extent which corresponds to the selected size.

A further main object of the invention consists in providing a frame of the above described type the width of which may be enlarged or shortened in any desired manner by adding complete frame sections, which are stiffened, reinforced and braced in the same manner in which all other parts of the frame are stiffened, reinforced and braced, thus permitting widening or enlarging of the frame while maintaining its rigidity, and further permitting to change the ratio of height and width in the desired manner.

A further main object of the invention consists in providing a frame with vertically shiftable frame members and telescoping braces which permit to change of the height of the frame and thereby a change of the height to width ratio, in accordance with the projection method selected.

In addition to these objects the invention has a number of more specific objects and of ancillary objects which are best explained in connection with the more detailed description of the structure.

The invention is illustrated in the accompanying drawing showing two modifications of the screen. It will however be understood that the modifications which are illustrated are shown by way of example only, the examples being selected in order to explain the principle of the invention and the best mode of applying said principle. The drawing could not attempt to illustrate all the variations which are necessary to comply with the conditions in various types of theaters and it will therefore be clear that a departure from the construction which has been illustrated is not necessarily a departure from the principle of the invention.

In the drawing:

Figure 1 is a perspective view of the entire frame structure in the case of a frame which is supported on a base movable on the floor.

Figure 2 is a plan view of the screen supporting frame structure shown in Figure 1.

Figure 3 is a sectional side view of the same screen supporting frame structure the section being taken along line 3—3 of Figure 1.

Figure 4 is a partly sectional elevational view of a detail, the section being taken along line 4—4 of Figure 2.

Figure 5 is a partly sectional plan view of a detail, the section being taken along line 5—5 of Figure 3.

Figure 6 is a partly sectional elevational view of another modification of the screen supporting frame, the parts shown in section being merely the tubular parts shown in section along a plane of symmetry.

The frame structure according to the invention which is illustrated in Figures 1, 2 and 3 comprises a number of horizontal screen holding and stretching frame members 10 and 16 and two vertical screen holding and stretching frame members 20 and 22. Usually the height of the frame is limited and the vertical members 20 and 22 may therefore form a single section. The horizontal frame members 10, 16 are however formed by a number of units, the number being determined by the desired angular width of the screen, said members being curved along a circle which has its center at a distance from the screen, and each of said horizontal frame members consists of a tubular member the end of which may be inserted into a tubular fitting or coupling 12, 14, 18 consisting of short tube sections of a larger diameter into which the tubes 10, 16 fit frictionally while permitting longitudinal movement. The couplings 12, 18 are T-shaped fittings with a vertical through going coupling member 17 which may encircle a through going vertical tube 20, 22 while its horizontal coupling member 19 is a one-way coupling member which holds one end of the tubular frame members 10 or 16 respectively.

The T-shaped couplings 12, 18 are provided at the two ends of the screen supporting frame in order to join the vertical frame members 20, 22 to the horizontal frame members 10, 16.

The couplings 14 join the horizontal frame members 10, 16 with each other and with the reinforcing braces. They are provided with tubular two-way coupling members 24, 25 arranged at right angles to each other which are joined by a tubular spacing member 26.

Each of the coupling members 12, 18 is provided with a slot or hole 28 near one of its ends or in some cases two slots or holes 28 are provided near both ends and each tubular vertical frame member 20, 22 is provided with a series of slots, openings or bores either along its entire length or near its ends. When slipped into the coupling members 12, 18, the vertical tubular frame members 20, 22 may therefore permit an adjustment of the coupling members at a desired height by selecting a suitable hole, bore or slot through which a cotter pin or key 30 may be pushed which secures the couplings in their places on the tubular frame members. In this way also the height of the screen or the distance between the horizontal frame members 10 and 16 may be adjusted in any desired manner.

The couplings 14 which join and hold adjacent horizontal frame members 10 or 16 respectively are, as above mentioned, also provided with vertical tubular members 25 through which tubular bracing members 32 are slipped which pass through the said tubular sections 25 and which are likewise provided with bores, holes or slots 41 which may be brought into alignment with slots or holes 42 on the said vertical tubular coupling sections 25. When in alignment cotter pins or keys 40 may be passed through the said slots, bore or holes in order to fix the coupling member on the tubular bracing members 32. This adjustment corresponds, of course, to the adjustment of the T-shaped coupling members 12, 18 on the vertical frame members 20, 22.

It will be noted that the bracing tubes 32 are thus at a distance corresponding to the length of the spacer tubes 26 behind the horizontal tubular frame members 10, 16 which carry the screen and therefore the screen surface stretched between the members 10, 16, 20 and 22 does not come into contact at any point with one of the braces arranged for giving rigidity to the frame structure. Such a contact is to be avoided because it produces shadows on the projection surface.

All the frame members, couplings and bracing members above described are preferably tubular and are made of a light metal or a light metal alloy so that the weight of the assembled frame structure is relatively insignificant.

As described below the screen is attached to the frame by stretching it between the frame members and the tension which is thus applied to the frame members and stretching the screen is rather heavy. As any deformation of the frame structure and especially a unilateral or irregular or local deformation must be prevented in order to avoid folds, creases and uneven surface portions and a wavy screen surface at certain spots the reinforcement by means of a single series of braces spaced from the screen surface is frequently not sufficient, especially in connection with large size screens, when the reinforcement and stiffening of the screen is therefore preferably improved by a multiple of series of braces arranged one behind the other.

Usually, a second series of braces is arranged each brace consisting of a tubular member 34 similar to members 32. This second row of braces is placed behind the braces 32 and behind the two frame members 20 and 22 and is joined to the aforesaid members by means of H-shaped couplings 36. Each of said H-shaped couplings comprises two substantially vertical two-way coupling members 37, 39 slipped over the bracing tubes 32 or the vertical frame members 20 and 22 which sections 37, 39 are joined and spaced by a horizontal tube section 38. The vertical coupling sections of the H-shaped couplings 36 are again provided with slots or holes 44 and the tubular braces 32, 34 and the frame members 20 and 22 respectively are provided with a series of bores or holes 41, which are brought into alignment with the slots 44 so that cotter pins or keys or other members 40 can be passed through the said holes to hold the braces firmly in spaced relation to each other so that the two braces 32, 34 can act as reinforcing units.

Preferably the H-shaped couplings are provided near the upper and lower ends of the braces and frame members, but somewhat spaced from the said upper and lower ends. They may be arranged immediately above the T-shaped coupling members 18 or above the coupling members 14.

The series of vertical bracing members 34 is also joined, near or preferably at its lower and its upper ends by horizontal tubular brace members 48 which connect and reinforce the braces 34 lengthwise. This connection is best produced by cruciform couplings 50, 52 with tubular two-way coupling members 53, 54 crossing each other, the vertical branch 53 of which is slipped over the tubular braces 34 while the horizontal coupling branch 54 is slipped over the horizontal tubular braces 48 which are inserted between the braces 34. These tubular braces 48 may also be curved which curvature may conform itself approximately to the curvature of the line along which the second row of braces is arranged. This curvature differs from that of the screen and is more accentuated on account of the equidistant spacing of the braces from the horizontal frame members 10, 16.

The outermost members of the series of braces 34 are joined to the remainder of the series by T-shaped couplings 56, one member of which is slipped over the brace 34 while the other member, standing out at right angles thereto is a one-way coupling member with holes at the end of the horizontal reinforcing braces 48.

All the cruciform and T-shaped couplings 50, 52, 56 are again provided with slots or bores cooperating with cooresponding bores on braces 34 and on the horizontal braces 48 which permit to fix them on the braces by means of cotter pins or keys 40. As will be clear the position of all these members may be adjusted vertically if a sufficient number of holes or slots are provided in the vertical braces 34, 32, 20 and 22.

When the frame has to be placed on the floor of the theater, as illustrated in Figures 1, 2 and 3 of the drawing, a case which is however less frequent than the suspension on the ceiling, each of the vertical frame members 20 and 22 as well as the vertical braces 34 behind them and the braces 32 together with the braces 34 arranged in the same radial plane enter into socket holes 61 provided in shoes 60, each shoe receiving a pair of tubular members such as the frame member 20 and the brace 34 or such as the bracing tube 32 and the bracing tube 34. The shoes are provided with casters 62 projecting from their underside and held in suitable holders or forks which casters may be formed in the well known manner either by balls or by rotatable rollers.

The frame is thus supported by a number of shoes on casters and, being sufficiently light, if made of light weight metal, it may be pushed without much effort along the floor and for instance it may be removed in this manner if not wanted for the moment.

Where space for receiving the frame and screen is lacking or moving of the screen along the floor is not permissible, the entire screen may be lifted from the floor so as to free the floor space and for this purpose the ends of the frame members 20, 22 and some of the braces 32 may be provided with eyes or rings 64, or members carrying such eyes or rings may be fitted into the tubular vertical frame members 20, 22 or brace members 32 may be secured therein by means of bores provided in said members through which cotter pins are inserted. Ropes or cables lowered from the upper floor of the theater may then be passed through the rings or eyes and the screen may thus be lifted bodily and may be removed from the ground floor freeing the same for performances other than those for which a screen is needed.

As the screens usually are of relatively large size it is preferable to provide a catwalk 65 near the upper end of the same preferably at such height below the upper frame members 16 that the said upper horizontal frame members may act as a guard rail. As seen the catwalk may consist of boards which are mounted on the horizontal spacing tubes of the H-shaped couplings and which are secured on said tubes by cotter pins or cables or by other suitable fastening means. The H-shaped couplings are so mounted on the braces that the proper distance between the catwalk boards and the horizontal frame members 16 acting as a guard rail is maintained. The catwalk 65 is rendered accessible by means of a ladder 66 at one end which is preferably formed by welding cross tubes, acting as the rungs of the ladder, between one of the frame members 22 and the brace member 34 behind it, or, as indicated at 67 by welding a cross tube between the couplings 18 and 56. If this is conveniently possible the cross member 38 of the H-shaped coupling may be used as a rung of the ladder.

It will be noted that with this construction of the screen supporting frame any size of the screen and any width, as well as any width to height (aspect) ratio may be obtained by adjusting or expanding the screen frame either by suitably adjusting the horizontal tubular frame members on the vertical members and brace members by means of the slots, holes and cotter pins, or by adding or taking away sections of the frame such as for instance one or more of the horizontal frame members 10, 16 and vertical brace members 32 and 34.

The height of the screen frame, as will be clear, is entirely determined by the height at which the upper coupling members 14 are fixed on the frame members 20, 22 and of the braces 32 and 34.

The horizontal width is mostly determined by suitably selecting the number of horizontal frame members 10 and horizontal bracing members 48 using the corresponding number of braces 32 and 34. Usually the variation in the width of the screen which is necessary is relatively large so that the removal or addition of an entire section will meet the needs in a particular case. If, in a special case the width is not a multiple of the length of the horizontal members one or more of said members may be cut down. As these members are simply tubes, this operation can easily be performed by the operator of the theater, or, if this case is occurring frequently, tubes of varying lengths may be kept on hand to be inserted between the frame members and the couplings carried by the braces. In any case, their adjustability is such that almost all regularly or frequently occuring changes can be made by mere re-adjustment, removal or insertion of parts an operation which is easily performed by the personnel of a theater.

The screen 70 is mounted on the frame in the manner described in my earlier application Serial No. 394,726 or in the manner shown in Figure 6 of the drawings. The screen is usually provided with eyes or with grommets 72 along its margin and similar eyes or grommets may be arranged along the frame members. The edge of the screen is then laced or tied to the frame members by means of a cord or wire. The frame members, as shown in Figure 6, may however, be without any grommets or eyes and the cord or wire may be simply passed around the frame the distances adjusting themselves quite perfectly if the attaching of the screen is done with some care.

The attachment of the screen of the frame is shown in the drawing in connection with the modification illustrated in Figure 6, but it will be clear that the attachment of the screen is the same whatever the means of supporting the frame.

Figure 6 illustrates a suspended screen frame constructed exactly like the one shown in Figures 1 to 3 and in which the vertical frame members and some of the brace members, if necessary, are provided with simple tubular couplings 75 permitting to attach these vertical members by means of cotter pins 76 passing through slots or bores to suspension rods 77. The suspension rods in their turn are slidably adjustable in tubular suspension members 78 which are depending from the ceiling or roof structure and within which the suspension rod 77 may be held by means of a series of bores 79 at a suitable height by means of screw bolts 80 passing through the bores and permitting to fix them within the tubular members 78.

The tubular members in their turn are then fixed on the ceiling or on the roof structure of the theater by means of suitable sockets 82. This structure is preferable and is most frequently used in all cases in which for some reason the floor space must be kept free. It will thus be seen that the screen supporting structure according to the invention has a number of great advantages for the manufacturer of such structures as well as for the user of the structure and that it permits to the operator of the theater to adjust his screen exactly to the performance, an advantage which has hitherto not been offered by any of the existing screens. As these performances are of a very varying nature it will be clear that the possibility of adjusting the screen to the performance and the further possibility of removing the screen if not needed will provide for a great variety of cases, especially if in addition to the curved large size screen also a flat smaller size screen is fixedly mounted on the wall of the theater. The theater is then equipped practically for any type of performance which may occur.

It will be clear that many changes of an unessential nature may be made in the constructive details without in any way departing from the essence of the invention as defined in the annexed claims.

What is claimed as new is as follows:

1. A wide angle motion picture projection screen assembly comprising a curved screen of pliable, flexible material concave on the picture receiving side held and tensioned solely along its marginal portion without contact with a supporting or other member along its curved surface stretched between said marginal portions, a first screen frame structure with vertical and curved horizontal tubular screen holding and tensioning frame members, the curved screen being held under high tension by the said tubular vertical and curved horizontal screen holding and tensioning frame members, a second bracing frame structure with curved horizontal frame members arranged at a distance from the first screen supporting frame structure for bracing the latter against deformation produced by the tensioning of the screen, the second bracing frame structure further consisting of a plurality of spaced bracing units, each unit consisting of a pair of interconnected vertical tubular members forming a transversely arranged frame in a plane substantially at right angles to the screen surface, said transversely arranged frames being interconnected by the curved horizontal bracing frame members, each being provided with horizontal spacing and bracketing members, projecting forwardly towards the screen and supporting and holding the curved horizontal screen holding and tensioning frame members at a distance from the bracing units which secure spacing between the screen and the said bracing units, the tubular vertical screen holding and tensioning frame members being themselves formed by one of the vertical tubular members of a transverse bracing frame unit, all bracing units being mounted on shoes provided with rotatable elements for rolling on the ground to produce mobility of the screen assembly.

2. A screen structure as claimed in claim 1, wherein the curved horizontal screen supporting and tensioning frame members on which the screen is attached are divided into sections the sectional curved horizontal screen supporting and tensioning frame members being held in short tubular sections arranged at the ends of the spacing and bracketing members forming part of a vertical tubular member of a bracing unit, said short tubular sections forming the heads of the spacing and bracketing sections.

3. A screen structure as claimed in claim 1, wherein the longitudinally extending curved screen supporting and tensioning frame members are held by means of tubular members tightly fitting and slipped over the said vertical tubular members, the tubular members tightly fitting and slipped over the curved screen supporting and tensioning members and bracing members being held on but spaced from the tubular member slipped over the vertical tubular members of the bracing units and joined to them by transverse fixation means.

References Cited in the file of this patent

UNITED STATES PATENTS

| | | |
|---|---|---|
| 735,204 | Buckenberger | Aug. 4, 1903 |
| 926,840 | Bagaason | July 6, 1909 |
| 1,150,869 | Lewin | Aug. 24, 1915 |
| 1,623,047 | Cook | Apr. 5, 1927 |
| 2,060,817 | Mahoney | Nov. 17, 1936 |
| 2,357,819 | Greer | Sept. 12, 1944 |
| 2,361,614 | Dugan | Oct. 31, 1944 |
| 2,369,143 | Hehn | Feb. 13, 1945 |
| 2,379,446 | Krueger | July 3, 1945 |
| 2,473,301 | Ramstad | June 14, 1949 |
| 2,486,206 | Renison | Oct. 25, 1949 |
| 2,580,536 | Fiorenzi | Jan. 1, 1952 |

FOREIGN PATENTS

| | | |
|---|---|---|
| 182,311 | Great Britain | July 6, 1922 |